United States Patent [19]

Chen et al.

[11] Patent Number: 5,378,393
[45] Date of Patent: Jan. 3, 1995

[54] GLASSY CHIRAL NEMATIC LIQUID CRYSTALLINE COMPOSITIONS OF LOW MOLAR MASS AND OPTICAL DEVICES FORMED FROM SAME

[75] Inventors: Shaw H. Chen, Penfield; Hongqin Shi, Rochester, both of N.Y.

[73] Assignee: The University of Rochester, Rochester, N.Y.

[21] Appl. No.: 153,570

[22] Filed: Nov. 16, 1993

[51] Int. Cl.$^6$ .................. C09K 19/52; C09K 19/34; C09K 19/32; G02F 1/13
[52] U.S. Cl. .................. 252/299.01; 252/299.61; 252/299.62; 359/106
[58] Field of Search .................. 252/299.01, 299.61, 252/299.62; 428/1; 359/103, 106

[56] References Cited

U.S. PATENT DOCUMENTS

| | | | |
|---|---|---|---|
| 3,711,181 | 1/1973 | Adams, Jr. et al. | 350/157 |
| 4,293,435 | 10/1981 | Portugall et al. | 252/299.01 |
| 4,410,570 | 10/1983 | Kreuzer et al. | 252/299.01 |
| 4,743,675 | 5/1988 | Watanabe | 428/1 |

OTHER PUBLICATIONS

Attard et al. *Liquid Crystals* 1992, vol. 11, No. 5, pp. 779–784.
Dehne & Roger, *Liquid Crystals*, 1989, vol. 6, No. 1, pp. 47–62.
Attard and Imire, *Liquid Crystals*, 1992, vol. 11, No. 5, pp. 785–789.
Inada & Shirata, *J. Mater. Chem.*, 1992, vol. 3(3), pp. 319–320.
Kreuzer et al., *Mol. Cryst. Liq. Cryst.*, 1991, vol. 199, pp. 345–378.
Freidzon et al., *Polymer Preprints*, 1993, vol. 34(1), pp. 146–147.
Percec et al., *Macromolecles*, 1992, vol. 25, pp. 3851–3861.
Wedler, et al., *J. Mater. Chem.*, 1991, vol. 1(3), pp. 347–356.
Wedler et al., *J. Mater. Chem.*, 1992, vol. 2(11), pp. 1195–1204.
Schafer et al., *Mol. Cryst. Liq. Cryst.*, 1990, vol. 191, pp. 269–276.
Eichler et al., *Mol. Cryst. Liq. Cryst.*, vol. 223, pp. 159–168.
Finkelmann, *Angew, Chem. Int. Ed. Engl.*, 1987, vol. 26, pp. 816–824.
Wu et al., *J. Appl. Phys.*, 1990, vol. 68, pp. 78–85.
Gray et al., *J. Chem. Soc. Chem. Commun.*, 1974, pp. 431–432.
Boller et al., *Z. Naturforsch.*, 1978, vol. 33b, pp. 433–438.
Hird et al., *Liquid Crystals*, 1993; vol. 15(2), pp. 123–150.
Krishnamurthy & Chen, *Macromolecules*, 1991, vol. 24, pp. 3481–3484; 1992, vol. 25, pp. 4485–4489.
Chen & Tsai, *Macromolecules*, 1990, vol. 23, pp. 5055–5058.
Tsai & Chen, *Macromolecules*, 1990, vol. 23, pp. 1908–1911.

*Primary Examiner*—Shean Wu
*Attorney, Agent, or Firm*—L. Fleckenstein; M. Lukacher

[57] ABSTRACT

A glassy thermotropic chiral nematic liquid crystalline composition comprises a glassy chiral nematic compound of low molar mass that includes a cycloaliphatic radical, a nematogenic moiety, and a chiral moiety, or a mixture of a nematic liquid crystalline compound of low molar mass that includes a cycloaliphatic radical and a nematogenic moiety and a chiral compound of low molar mass that includes a cycloaliphatic radical and a chiral moiety. Each cycloaliphatic radical contains 4 to about 18 carbon atoms. An optical device is formed from the described glassy thermotropic chiral nematic liquid crystalline composition.

32 Claims, No Drawings

GLASSY CHIRAL NEMATIC LIQUID CRYSTALLINE COMPOSITIONS OF LOW MOLAR MASS AND OPTICAL DEVICES FORMED FROM SAME

FIELD OF THE INVENTION

This invention relates to glassy thermotropic chiral nematic liquid crystalline compositions having low molar mass, and more particularly to their use for forming optical devices that produce reflected light in the visible and near infrared regions.

BACKGROUND

Liquid crystalline materials exhibiting the cholesteric mesophase have been proposed for use in a variety of optical device applications, for example, notch filters, circular polarizing filters, selective reflectors, beam splitters, and beam apodizers. U.S. Pat. No. 3,711,181, for example, discloses an optical apparatus for modulating circular-polarized light that contains optically negative liquid crystal films.

Polymeric liquid crystalline compositions have been proposed as potentially useful for the aforementioned applications. U.S. Pat. No. 4,293,435 discloses a liquid-crystalline cholesteric polymer phase that consists essentially of a copolymer of particular nematogenic and chiral acrylic ester monomers. In U.S. Pat. No 4,410,570 is disclosed a liquid crystalline phase that contains a cyclic organopolysiloxane to which is chemically bonded at least one mesogenic group. Thermotropic cholesteric liquid crystalline glutamate copolymers consisting of chiral glutamate ester repeating units are disclosed in U.S. Pat. No. 4,743,675.

Besides polymeric liquid crystalline compositions, there has been an interest in discovering glass-forming liquid crystalline compounds of low molar mass. For example, Attard et al., *Liquid Crystals*, 1992, Vol. 11, No. 5, pp. 779-784 describes liquid crystalline compounds in which rod-shaped mesogenic groups are attached to a benzene-1,35-tricarbonyl nucleus. "Siamese-twin" molecules in which two rod-shaped mesogenic moieties are linked by a sulfonyl radical are described in Dehne and Roger, *Liquid Crystals*, 1989, Vol. 6, No. 1, pp. 47-62.

Attard and Imrie, *Liquid Crystals*, 1992, Vol. 11, No. 5, pp. 785-789, describes symmetrical liquid crystalline compounds containing a central alkylene chain and a 1-aminopyrene moiety at either end. Liquid crystalline "starburst" molecules, 1,3,5-tris[4-(diphenylamino)-phenyl]benzene and its methylsubstituted derivatives, are described in Inada and Shirota, *J. Mater Chem.*, 1993, Vol. 3(3), pp 319-320.

Kreuzer et al., *Mol. Cryst. Liq. Cryst.*, 1991, Vol. 199, pp. 345-378, describes cyclic organopolysiloxane compounds containing mesogenic substituents. Liquid crystalline cyclic organopolysiloxanes containing cholesterogenic or chiral substituents are disclosed in U.S. Pat. No. 4,410,570 to Kreuzer and Gawhary. Freidzoa el al., *Polymer Preprints*, 1993, Vol. 34(1), pp. 146-147, describes liquid crystalline cyclophosphazene compounds with cholesteryl-substituted mesogenic groups.

Another type of liquid crystalline composition of low molar mass is characterized by inclusion of mesogenic units as part of a macrocycle, as described, for example, in Percec et al., *Macromolecules*, 1992, Vol. 25, pp. 3851-3861.

Wedler et al., *J. Mater. Chem.*, 1991, Vol. 1(3), pp. 347-356, notes that prevention of crystallization in liquid crystalline phases of pure compounds of low molar mass is a serious practical problem and proposes the use of mixtures of compounds. Wedler et al., *J. Mater. Chem,*, 1992, Vol. 2(11), pp. 1195-1204, describes mixtures containing Siamese-twin and naphthyl ester mesogenic compounds. Mixtures of naphthyl esters to form liquid crystalline glassy compositions are also described in Schafer et al., *Mol, Cryst. Liq. Cryst.*, 1990, Vol. 191, pp. 269-276. Eichler et al., Mol. Cryst. Liq. Cryst., 1992, Vol. 223, pp. 159-168, describes the use of mixtures of liquid crystalline compounds containing a cholesteric addendum for the formation of erasable holographic gratings.

Many applications of chiral liquid crystalline materials in optical devices require compositions capable of forming both right- and left-handed helical structures. When a film of such a composition is applied to a substrate, the helical structures must be capable of forming and maintaining the Grandjean texture, in which the helical axis is perpendicular to the substrate surface, to enable the selective reflection of circular-polarized light. An enantiomeric chiral pair of liquid crystalline compositions, whose individual structures are characterized as a right-handed and a left-handed helix, are thus capable of selectively reflecting right-handed and left-handed circular-polarized light, respectively. Especially useful for optical information storage applications are chiral nematic liquid crystalline compositions which form clear, transparent films that absorb no light in the visible region but do selectively reflect visible and near-infrared circular-polarized light.

Although thermotropic liquid crystalline polymers exhibiting stable at ambient temperature are well known, it is exceedingly difficult to achieve simultaneous mesophase formation and vitrification characteristics at temperatures above the ambient with compounds of low molar mass. A further challenge is presented by the objective of discovering chiral liquid crystalline materials of low molar mass that have the capability of forming both right-handed and left-handed helical structures. In addition, these materials must exhibit solubility characteristics which enable their processing into clear glassy thin films for use as optical devices. All of these requirements are met by chiral nematic liquid crystalline compositions with low molar mass of the present invention.

BRIEF SUMMARY OF THE INVENTION

In accordance with the invention, a glassy thermotropic chiral nematic liquid crystalline composition comprises a glassy chiral nematic compound of low molar mass having the formula:

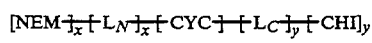

or a mixture of a nematic liquid crystalline compound of low molar mass having the formula:

and a chiral compound of low molar mass having the formula:

-continued where

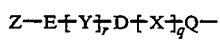

each independently represents a cycloaliphatic radical containing about 4 to 18 carbon atoms;

[NEM]

represents a nematogenic moiety having the formula:

Z—E—[Y]$_r$—D—[X]$_q$Q— where —Q— is an alkylene radical containing 1 to about 8 carbon atoms, —X— is —O—, —S—, or —CH$_2$—, —Y— is

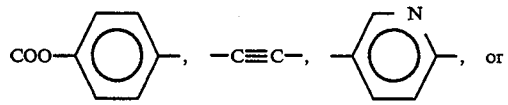

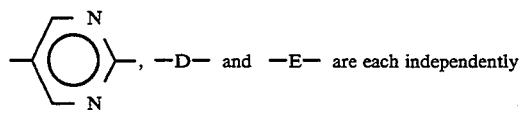

, —D— and —E— are each independently

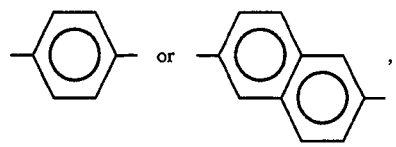

—Z is —CN, —NO$_2$, —N=C=S, or an alkoxy radical containing up to about 4 carbon atoms, and q and r are each independently 0 or 1;

[CHI]

represents a chiral moiety having the formula:

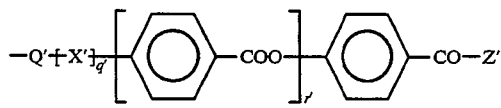

where Q' is an alkylene radical containing 1 to about 8 carbon atoms. —X' is —O—, —S—, or —CH$_2$—, Z' is an alkoxy, aralkoxy, alkylamino, or aralkylamino radical containing about 4 to 12 carbon atoms and containing at least one asymmetric carbon atom, and q' and r' are each independently 0 or 1; —L$_N$— and —L$_C$— each individually represents a connecting group having the formula:

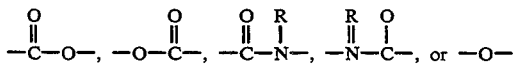

where R is hydrogen or alkyl containing up to 4 carbon atoms, or forms a portion of a cycloaliphatic radical containing about 4 to 18 carbon atoms: and x is 1 to 6, and y is at least 1, with the proviso that when

[CYC]

is chiral, y can be zero.

The invention further provides an optical device formed from a glassy thermotropic chiral nematic liquid crystalline composition as described above.

DETAILED DESCRIPTION

A glassy thermotropic chiral nematic liquid crystalline composition of the present invention can comprise a single pure compound of low molar mass that includes a cycloaliphatic radical to which is attached a nematogenic moiety and a chiral moiety. Alternatively, the composition can comprise mixtures of compounds, such as the following:

(a) a mixture of compounds of low molar mass formed by the attachment of a common nematogenic moiety and a common chiral moiety in differing proportions to a common cycloaliphatic radical;

(b) a mixture of two or more pure chiral nematic liquid crystalline compounds of low molar mass containing different nematogenic or chiral moieties or different cycloaliphatic radicals;

(c) a mixture of one or more nematic liquid crystalline compounds of low molar mass and a chiral compound of low molar mass.

Mixtures obtained by combination of a), b), and c) above are also contemplated.

In accordance with the present invention, cycloaliphatic radicals can contain 4 to about 18 carbon atoms in the ring structure. The ring can contain other atoms in addition to carbon; nitrogen, oxygen and sulfur, for example, can be included in the ring structure, which can comprise up to about 24 atoms. An asymmetric carbon atom can also be included, which imparts chirality to the cycloaliphatic radical and compounds containing it. Furthermore, the cycloaliphatic radical need not contain only a single ring; bicyclic and tricyclic structures are also contemplated. Preferably the cycloaliphatic radical contains about five to ten carbon atoms, most preferably, six carbon atoms.

Nematogenic and chiral moieties can be joined to the cycloaliphatic radicals by carbonyloxy, oxycarbonyl, carbonyl, carbonamido, or oxy connecting groups; the resulting compounds are thus esters, amides, acetals, or ketals.

From 1 to 6 nematogenic moieties can be attached via connecting groups to the cycloaliphatic radical. To form a chiral compound in accordance with the invention, at least one chiral moiety is joined to the cycloaliphatic radical by a connecting group except that, when the cycloaliphatic radical is itself chiral, no addition chiral moieties need be attached.

Table 1 below is a listing of representative compounds from which cycloaliphatic radicals suitable for the practice of the invention can be derived. The listed cycloaliphatic compounds contain substituents such as carboxy, carboxylic anhydride hydroxy, amino, keto, and formyl to enable formation of the previously described connecting groups. Of course, other substituents such as, for example, alkyl groups containing up to about 4 carbon atoms, can also be present.

TABLE 1

1,3,5-cyclohexanetricarboxylic acid
(1R,3S)-(+)-camphoric acid

TABLE 1-continued 1,4-cyclohexanedimethanol
1-amino-1-cyclopentanecarboxylic acid
tetrahydrofuran-2,3,4,5-tetracarboxylic acid
2,6-dimethylpiperazine
homopiperazine
1,4,7-triazacyclonanane
1,5,9-triazacyclododecane
1,4,8,11-tetrazacyclotetradecane
1,4,7,10-tetraazacyclododecane
1,4,7,10,13,16-hexaazacyclooctadecane
bicyclo[2.2.2]oct-7-ene-2,3,5,6-tetracarboxyl dianhydride
1,3-adamantanedicarboxylic acid
trans-4-(aminomethyl)cyclohexanecarboxylic acid
1,2,3,4-cyclobutanetetracarboxylic dianhydride
(1R)-(+)-camphor
(1S)-(−)-camphor
cyclohexanecarboxaldehyde A nematogenic moiety as described above contains a mesogenic group, which imparts liquid crystalline characteristics to the moiety and to compositions formed from it. This mesogenic group, which typically has a rod-shaped molecular structure (Cf. H. Finkelmann, Angew. Chem. Int. Ed. Engl., 1987, vol. 26, pp. 816–824), is attached to a flexible link —Q—, which is an alkylene radical having either a straight or branched chain and containing one to about eight, preferably about two to six, carbon atoms. To obtain a liquid crystalline composition with high optical birefringence, it is desirable that the —Y— and —Z groups in nematogenic moieties contain a multiplicity of conjugated unsaturated bonds; however, this conjugated unsaturation must not cause substantial absorption of light in the visible region by the liquid crystalline composition. Useful mesogenic groups for the practice of the present invention include: biphenyl and diphenylacetylene moieties described in the aforementioned paper by Finkelmann and by Wu et al., J. Appl. Phys., 1990, vol. 68, pp. 78–85; terphenyl groups described by Gray et al., J, Chem Soc. Chem. Commun., 1974, pp. 431–432; diphenylpyrimidines, as reported by Boller et al., Z. Naturforsch, 1978, vol. 33b, pp. 433–438; and 2,6-disubstituted naphthalene moieties, as described by Hird et al., Liquid Crystals, 1993, vol. 15(2) pp. 123–150. An acetylenic moiety, —C≡C—, and a carbonyloxyphenyl moiety are preferred as the —Y— groups. Suitable —Z substituents are included in the aforementioned papers of Finkelmann and Wu et al.; preferred —Z substituents are cyano or methoxy.

A chiral moiety as described above contains an optically active chiral group that includes at least one asymmetric carbon atom and is joined to a link —Q'—, which is an alkylene radical having either a straight or branched chain and containing one to about seven, preferably about two to six, carbon atoms.

As discussed above, compounds comprising the chiral nematic liquid crystalline compositions of the invention are esters, amides, acetals, or ketals. Esters and amides are formed by the reaction of reactive equivalents of carboxylic acids, for example, carboxyl halides, carboxylic anhydrides, and carboxylic esters derived from volatile, low molecular weight alcohols with alcohols and amines, respectively. The carboxylic acid reactive equivalent can be present in the reactant that provides the cycloaliphatic radical, with the reactants that provide the nematogenic and chiral moieties being amines or alcohols. Alternatively, the reactant that is the source of the cycloaliphatic radical can contain amino or hydroxy groups, with the carboxylic acid reactive equivalents being included in the reactants that provide the nematogenic and chiral moieties. Acetals and ketals can be formed by the acid-catalyzed condensation of alcohols containing nematogenic or chiral substituents with aldehydes or ketones, respectively, which are the source of the cycloaliphatic radicals. The aforementioned aldehydes or ketones can also include nematogenic or chiral substituents.

A liquid crystalline composition of the present invention that includes a chiral moiety as described above exhibits selective reflection of visible and near infrared circular-polarized light of wavelength $\lambda_R$. The selective reflection wavelength $\lambda_R$ can be varied by changes in the structure and concentration of the chiral moiety in the liquid crystalline composition. To achieve liquid crystalline compositions whose selective reflection wavelengths are in the visible region, it is necessary that the compositions exhibit adequate helical twisting power. The helical twisting power of a chiral liquid crystalline composition can be determined from the slope of the plot of the reciprocal of the selective reflection wavelength $1/\lambda_R$ vs the mole fraction of the chiral component as the mole fraction approaches zero (cf. S. Krishnamurthy and S. H. Chen, Macromolecules, 1991, vol. 24, pp. 3481–3484; 1992, vol. 25, pp. 4485–4489). Helical twisting power of chiral nematic liquid crystalline compositions depends not only on the structure of the chiral moieties but also on the structure of the nematogentic moieties, in particular, the extent of the conjugated unsaturation and the length of the flexible link in these moieties (cf. S. Chen and M. L. Tsai, Macromolecules, 1990, vol. 23, pp. 5055–5058).

Many applications of the chiral liquid crystalline compositions of the present invention require a pair of structurally related compositions, one capable of forming a right-handed and the other a left-handed helical structure, which enables them to selectively reflect right-handed and left-handed circular-polarized light, respectively. Using an enantiomeric pair of compounds to form two chiral moieties of opposite chirality, which are then combined with a common nematogenic moiety, provides a pair of liquid crystalline compositions capable of forming right- and left-handed helices.

This is illustrated, for example, by the chiral nematic liquid crystalline copolymers containing chiral moieties prepared from R-(+)- and S-(−)-1-phenylethylamine that form helical structures of opposite handedness, as described in M. L. Tsai and S. H. Chen, Macromolecules, 1990, vol. 23, pp. 1908–1911.

In accordance with the present invention, optically active compounds preferred for preparing chiral moieties as described above include the enantimomers of 1-phenylethanol, 1-phenylpropanol, 2-methoxy-2-phenylethanol, mandelic acid methyl ester, α-tetralol, 1-phenylethylamine, 1-cyclohexylethylamine, and 3-amino-ε-caprolactam, camphorcarboxylic acid, menthyloxyacetic acid, 1-methyl-2 oxocyclohexanepropionic acid methyl ester, 2-phenylpropionic acid, and camphor. Especially preferred are the enantiomeric pairs of 1-phenylethanol and 1-phenylethylamine.

As discussed above, the chiral nematic liquid crystalline compositions of the present invention absorb no light in the visible region but do selectively reflect visible circular-polarized light. They exhibit a helical twisting power sufficient to produce selective reflection wavelengths in the visible and near infrared region and are capable of forming both right-and left-handed helical structures.

In forming an optical device in accordance with the present invention, a film of a chiral nematic liquid crystalline composition is applied to a transparent substrate such as glass or fused quartz. The film can be formed from a melt of the chiral nematic liquid crystalline composition, or it can be formed by applying a solution of the composition in a volatile organic solvent to the substrate, followed by drying to remove the solvent. To utilize the latter method for film formation, it is preferred that the composition be soluble in organic solvents such as methylene chloride, chloroform, tetrahydrofuran, and the like.

The film of the chiral nematic liquid crystalline composition on the substrate has a thickness of about 0.5 μm to 50 μm, preferably about 5 μm to 20 μm. Furthermore, the film in the liquid crystalline phase is capable of forming and maintaining the Grandjean texture, in which the helical liquid crystalline structure in the film is perpendicular to the surface of the substrate.

After the film of the chiral nematic liquid crystalline composition has been applied to the transparent substrate, it is annealed by first heating at a temperature that is above the glass transition temperature but below the clearing temperature of the composition, then cooling to a temperature below the glass transition temperature. In the annealing step, the Grandjean texture is formed in the chiral nematic liquid crystalline film and is maintained when the film is cooled below the glass transition temperature. Annealing is suitably performed at a temperature that is about 0.86 to 0.98, preferably about 0.90 to 0.95, of the clearing temperature for a period of about 0.5 hour to 16 hours, preferably about 1 hour to 2 hours. To form and maintain the Grandjean texture in the film, the clearing temperature should be at least about 30° C. higher than the glass transition temperature.

In Table 2 are shown the formulas of representative nematic liquid crystalline compounds useful in compositions of the present invention.

TABLE 2

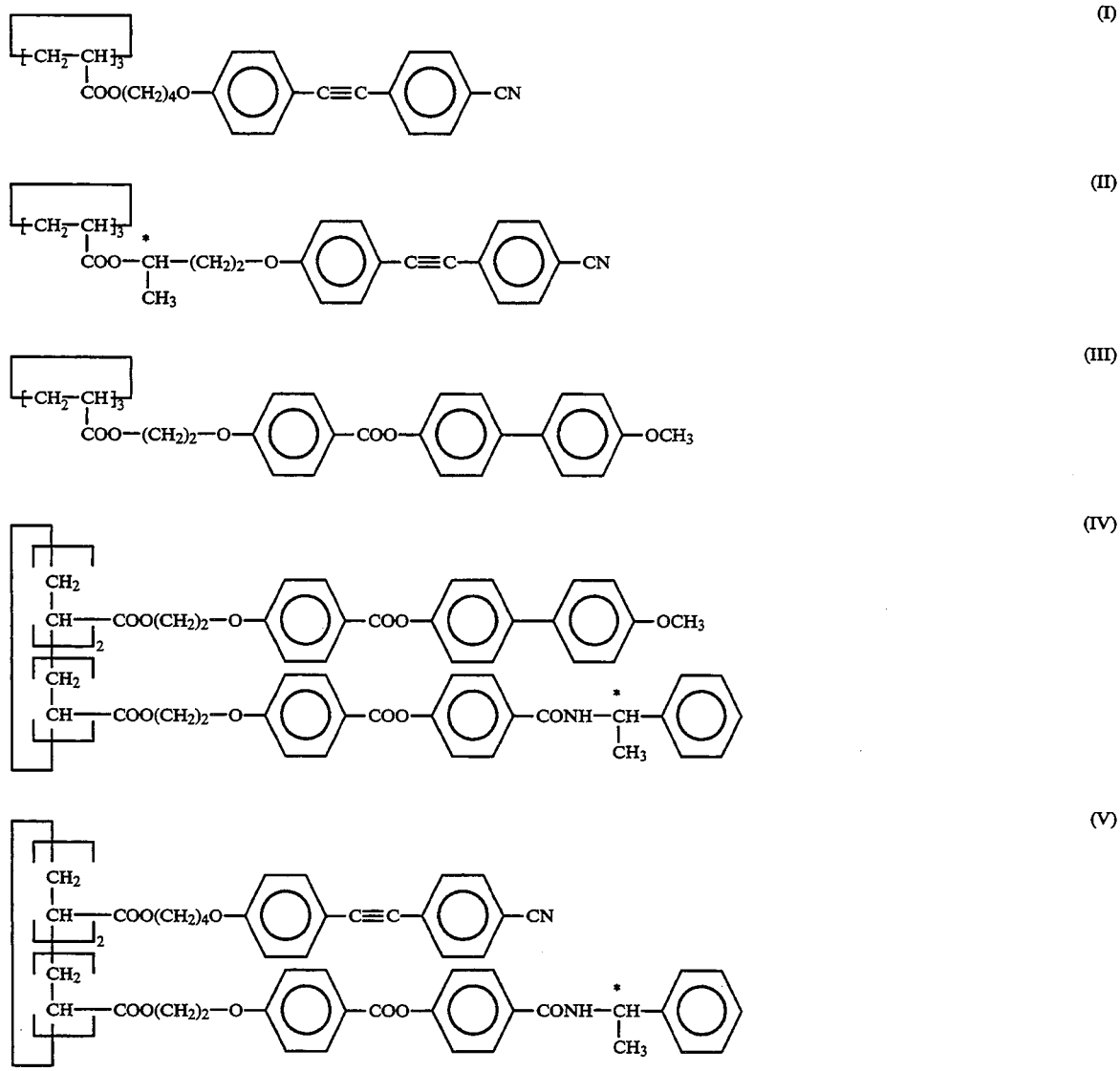

TABLE 2-continued
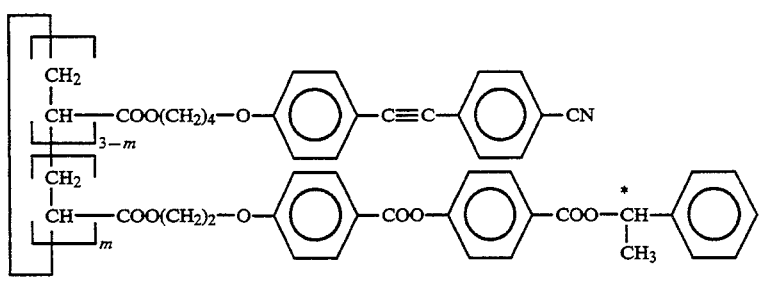 (VI)
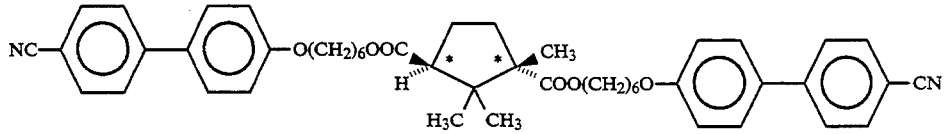 (VII)
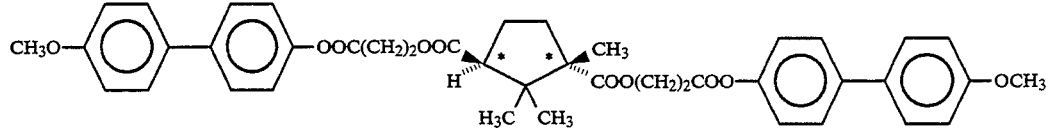 (VIII)
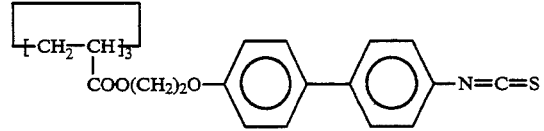 (IX)
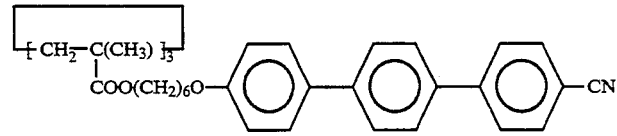 (X)
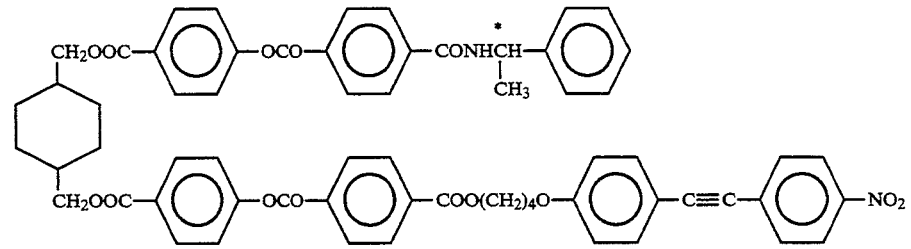 (XI)
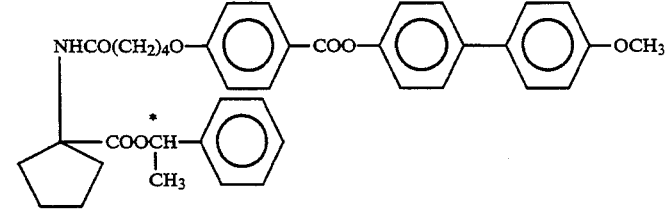 (XII)
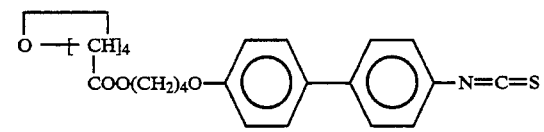 (XIII)

TABLE 2-continued
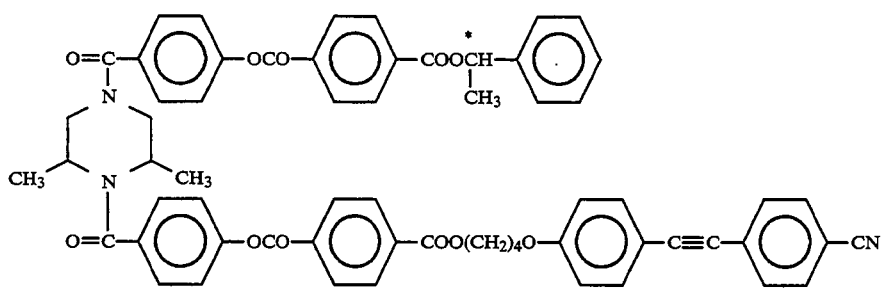
(XIV)
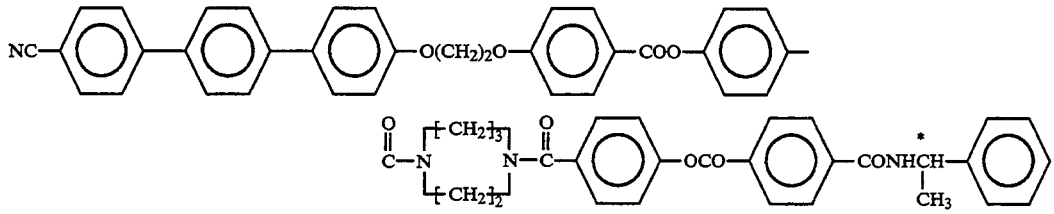
(XV)
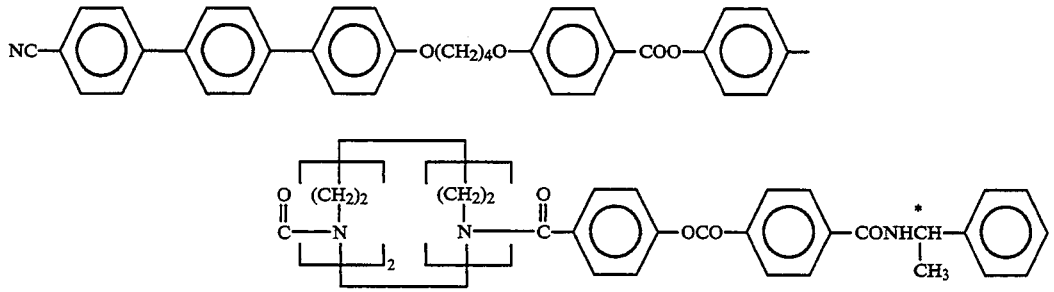
(XVI)
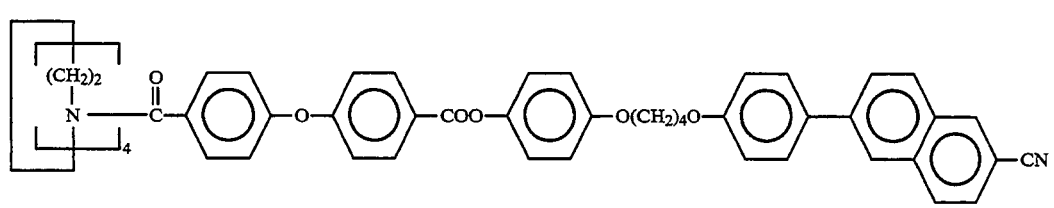
(XVII)
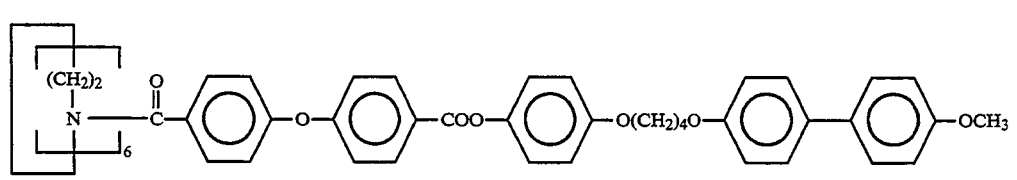
(XVIII)
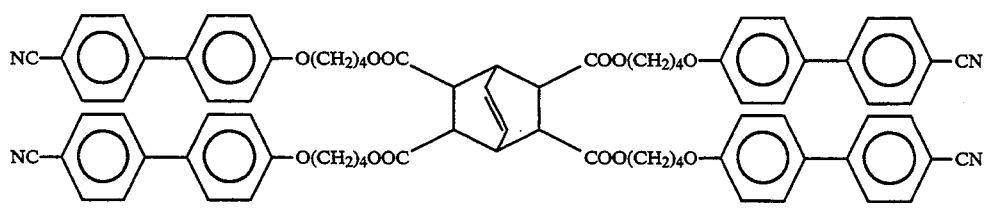
(XIX)
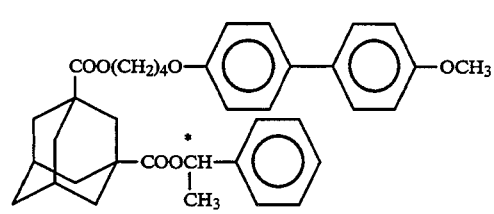
(XX)

TABLE 2-continued
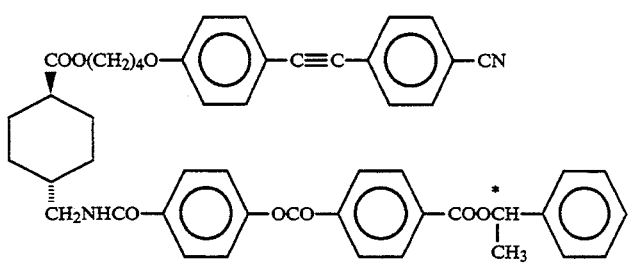
(XXI)
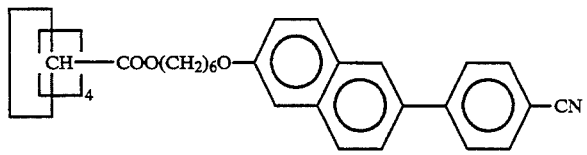
(XXII)
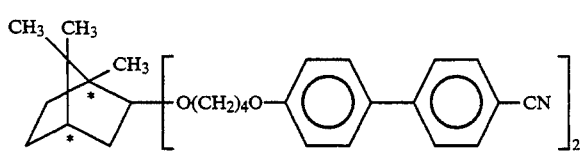
(XXIII)
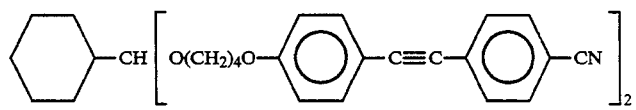
(XXIV)
The following examples further illustrate the invention.
Example 1
Preparation of Compound (I)
Compound (I) was prepared by the following reaction scheme:
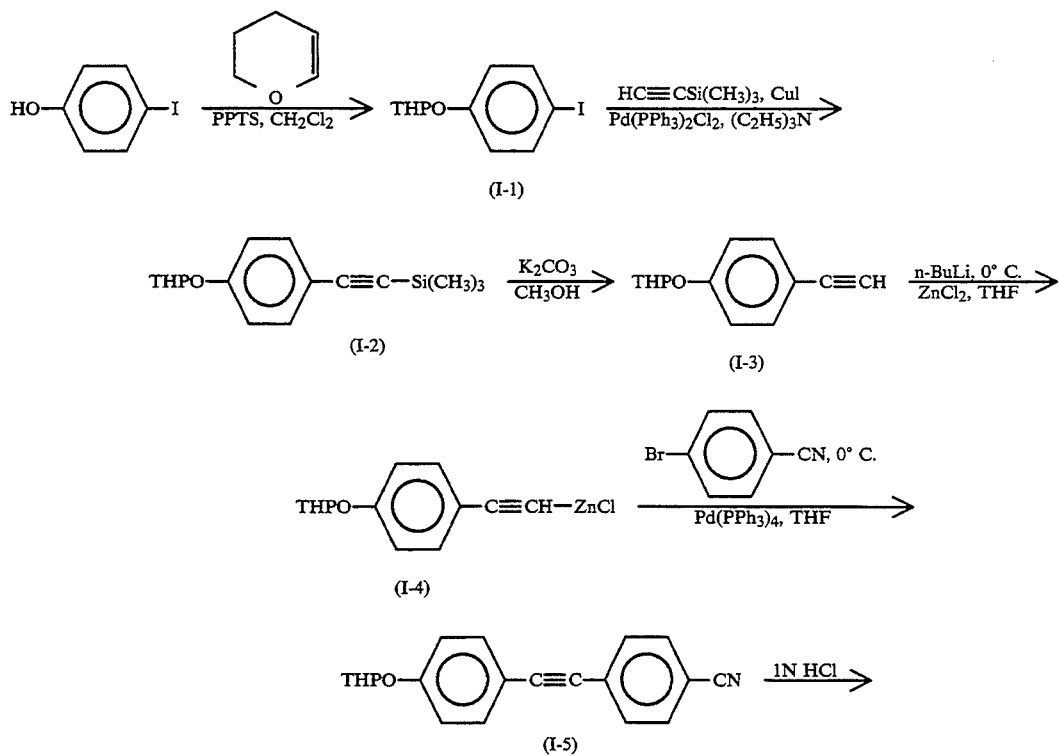

-continued

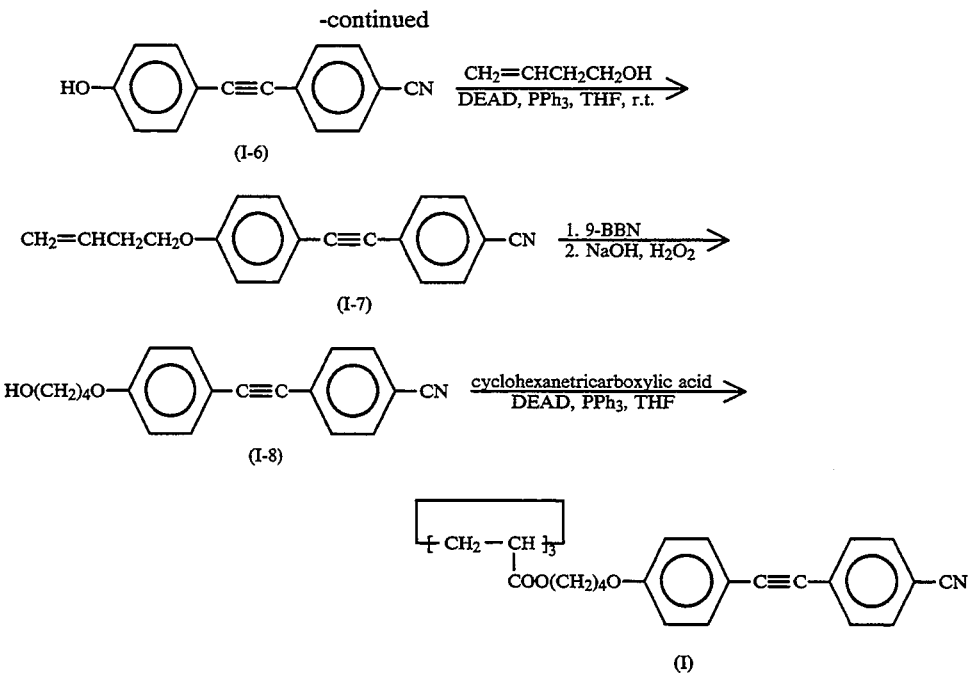

(I-1): A solution of 4-iodophenol (74.4 g, 338 mmole) and dihydropyran (84.1 g, 1 mole) in 800 mL of anhydrous methylene chloride containing pyridinium p-toluenesulfonate, PTTS, (17.5 g, 69.6 mmole) was stirred at room temperature for 5 hr.

Then the solution was diluted with ether and washed several times with half-saturated brine to remove the catalyst. After evaporation of the solvent, the residue was recrystallized from ethanol to yield the tetrahydropyranyl (THP) ether (I-1 ) (90 g, 85%).

(I-2): To a mixture of (I-1) (25 g, 82.2 mmole) and (trimethylsilyl)acetylene (12 g, 122 mmole) in 300 mL of triethylamine were added bis(triphenylphosphine) palladium dichloride (1 g, 1.40 mmole) and copper(I) iodide (9.133 g, 0.70 mmole). The reaction mixture was stirred under nitrogen at room temperature for 3 hr before the solvent was removed under reduced pressure. The residue was extracted with 500 mL of petroleum ether; the extract was filtered, and the filtrate was washed with water and dried over anhydrous $MgSO_4$. After evaporation of the solvent, the crude product was purified by flash chromatography on silica gel using 1:15 diethyl ether/petroleum ether as the eluent. The pale yellowish solid was recrystallized from ethanol to yield (I-2) (15 g, 66%).

(I-3): 5.0 g(I-2)( 18.2 mmole) and anhydrous potassium carbonate (1.0 g, 7.23 mmole) were dissolved in 100 mL of methanol and stirred for 2 hr. The solvent was then evaporated, and the residue was dissolved in 200 mL of petroleum ether. The solution was washed with water, dried over anhydrous $MgSO_4$, and evaporated. Recrystallization of the residue from ethanol gave (I-3) (3.62 g, 98%).

(I-4): To a solution of (I-3) (3.4 g, 16.8mmole) in 10mL of anhydrous tetrahydrofuran (THF) at 0° C. was added n-butyllithium (0.078 g, 16.8 mmole) in hexane (2M). The solution was stirred for 5 min prior to adding anhydrous zinc chloride (2.29 g, 16.8 mmole) dissolved in anhydrous THF (20 mL). The mixture was stirred at room temperature for an additional 15 min.

(I-5) & (I-6): To the solution containing (I-4) cooled to 0° C., a solution of 4-bromobenzonitrile (3.07 g, 16.8 mmole) in anhydrous THF (20 mL) and a solution of tetrakis(triphenylphosphine) palladium (0.5 g, 0.43 mmole) in anhydrous THF (20 mL), both at 0° C, were added sequentially to obtain (I-5), which was not isolated. Instead, 30 mL of 1N HCl solution and 10 g of ammonium chloride were added to form two clearly separated layers, which were stirred at room temperature for another 3 hr to deprotect the hydroxyl group. The two layers were separated upon shaking with 50 mL of petroleum ether, and the aqueous portion was extracted with petroleum ether. The organic portions were combined, washed with a saturated aqueous solution of sodium bicarbonate, and dried over anhydrous $MgSO_4$. After the solvent was evaporated off under reduced pressure, the brown residue was purified by flash chromatography on silica gel with methylene chloride as the eluent. The yellowish product was recrystallized from chloroform to give (I-6) (2.35 g, 64%).

(I-7): To a stirred solution containing (I-6) (3.0 g, 13.68 mmole), triphenylphosphine (4.31 g, 16.41 mmole) and 3-buten-1-ol (1.42 mL, 16.41 mmole) in 30 ml of anhydrous THF was added dropwise a solution of diethyl azodicarboxylate (DEAD) (2.02 mL, 16.41 mmole) in 10 mL of anhydrous THF under a nitrogen atmosphere. The reaction mixture was stirred for 3 hr before the solvent was evaporated. The solid residue was purified by flash chromatography on silica gel with 10:1 methylene chloride/hexane as the solvent and the eluent. Further purification was accomplished via recrystallization from methanol containing a little methylene chloride to yield (I-7) (3.39 g, 91%).

(I-8): To a stirred solution of (I-7) (2.42 g, 8.86 mmole) in 10 mL of anhydrous THF was added slowly 0.5 M solution of 9-borabicyclo[3,3,1 ]nonane (9-BBN) in THF (21.27 mL, 10.64 mmole). The reaction mixture was stirred for 4 hr at room temperature; then 5 mL of ethanol, 2 mL of 6N sodium hydroxide solution, and 4 mL of 30% hydrogen peroxide solution were added sequentially. The reaction was allowed to proceed for another hour before dilution with 100 mL of methylene chloride. The solution was washed with water and dried over anhydrous MgSO₄. Upon evaporating the solvent, the solid residue was purified by flash chromatography on silica gel with methylene as the eluent. Further purification was accomplished via recrystallization from ethanol, yielding (I-8) (2.36 g, 92%).

(I): To a stirred solution containing (I-8) (0.606 g, 2.08 mmole), triphenylphosphine (0.55 g, 2.08 mmole) and 1,3,5-cyclohexanetricarboxylic acid (0.136 g, 0.63 1 mmole) in 15 mL of anhydrous THF was added dropwise a solution of diethyl azodicarboxylate (DEAD) (0.255 mL, 2.08 mmole) in 5 mL of anhydrous THF under a nitrogen atmosphere. The reaction mixture was stirred for 3 hr before the solvent was evaporated. The solid residue was purified by flash chromatography on silica gel with 40:1 methylene chloride/acetone as the solvent and the eluent. Further purification was accomplished via recrystallization from methanol containing a little methylene chloride, yielding (I) (0.62 g, 95%). Elemental analysis: % Calculated: C, 76.50; H, 5.51; N, 4.06; % Found: C, 76.25; H, 5.72; N, 4.07.

Thermal transition temperatures were determined for (I), using differential scanning calorimetry. Its glass transition temperature, $T_g$, was 28° C.; its clearing temperature, $T_c$, was 124° C.

Example 2

Preparation of Compound (II)

Compound (II) was prepared by the following reaction scheme:

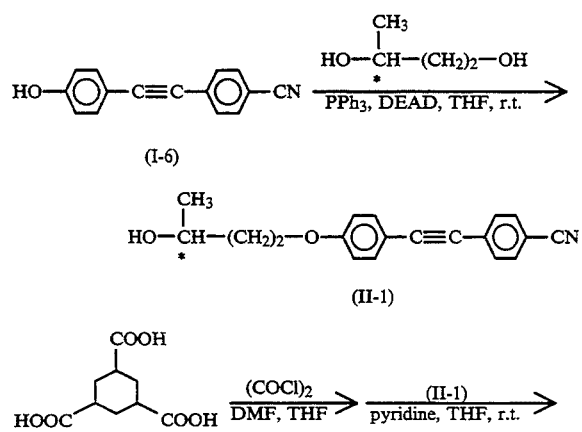

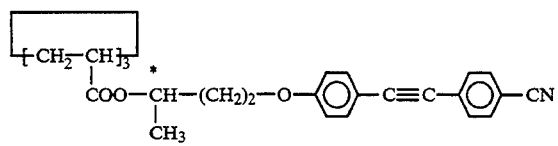

(II-1 ): To a stirred solution containing (I-6) (0.86 g, 3.93 mmole), triphenylphosphine (1.24 g, 4.71 mmole), and (S)-(+)-1,3-butanediol (0.42 g, 4.71 mmole) in 10 mL of anhydrous THF was added dropwise a solution of diethyl azodicarboxylate (DEAD) (0.41 mL, 4.71 mmole) in 5 mL of anhydrous THF under a nitrogen atmosphere. The reaction mixture was stirred for 3 hr before the solvent was evaporated. The solid residue was purified by flash chromatography on silica gel with 20:1 methylene chloride/acetone as the solvent and the eluent to obtain (II-1) (0.8 g, 70%).

(II): To a solution containing 1,3,5-cyclohexanetricarboxylic acid (0.165 g, 0.76 mmole) and a few drops of N,N-dimethylformamide in 10 mL of anhydrous THF was added dropwise 2M oxalyl chloride solution in anhydrous THF( 1.37 mL of solution containing 2.75 mmole of oxalyl chloride) at room temperature. After stirring the reaction mixture for 1 hr, the solvent was evaporated, and excess oxalyl chloride was removed under vacuum. The resultant acid chloride was dissolved in 10 mL of anhydrous THF, and the solution was added to a mixture of (II-1) (0.80 g, 2.75 mmole) and pyridine (0.22 mL, 2.75 mmole) in 10 mL of anhydrous THF. The reaction mixture was stirred for 12 hr before the solvent was evaporated. The solid residue was purified by flash chromatography on silica gel with methylene chloride as the solvent and the eluent. Further purification was accomplished via precipitation from methanol, yielding (II) (0.71 g, 90%). Elemental analysis: % Calculated: C, 76.50; H, 5.51; N, 4.06; % Found: C, 76.23; H, 5.68; N, 4.04.

Example 3

Preparation of Compound (III)

Compound (III) was prepared by the following reaction scheme:

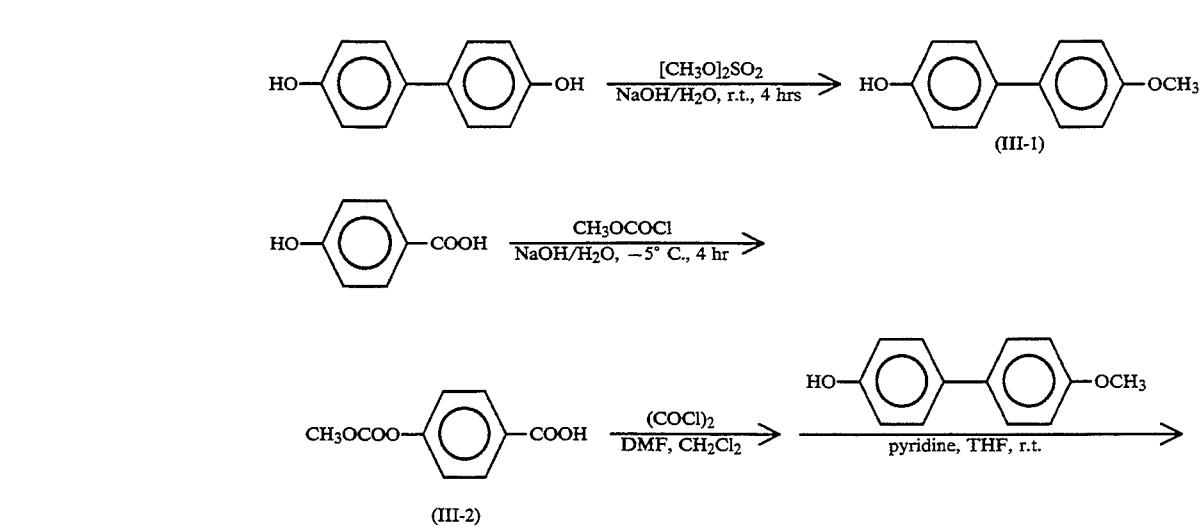

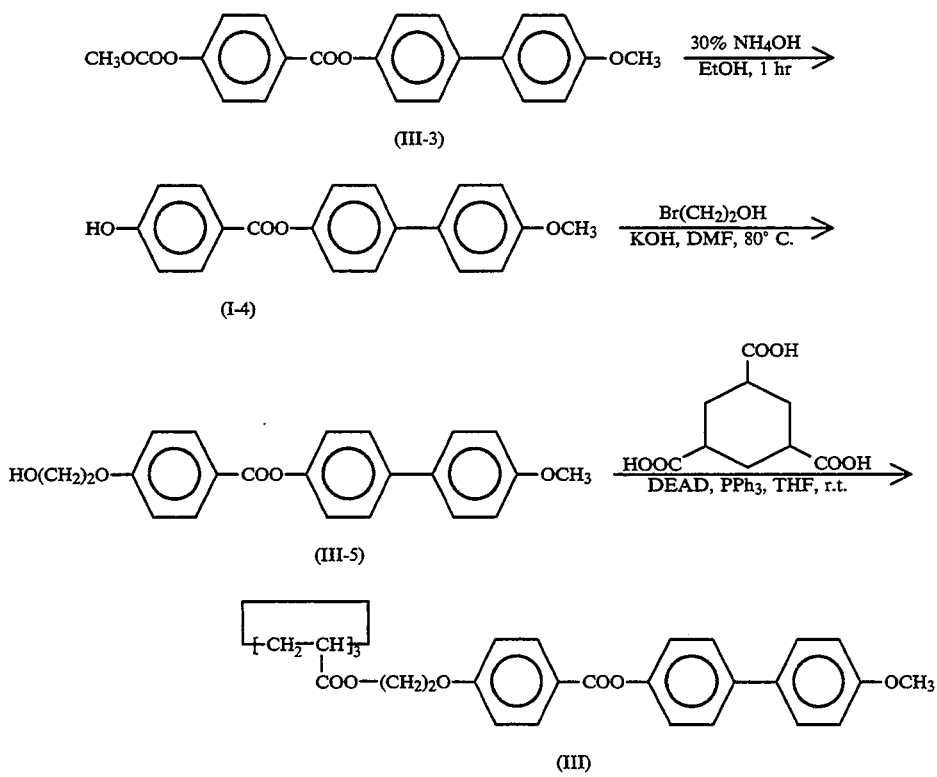

(III-1): 4,4'-dihydroxybiphenyl (40.0 g, 0.215 mole) was dissolved in a solution of sodium hydroxide (17.2 g, 0.43 mole) in 160 mL of water, to which dimethyl sulfate (27 g, 0.214 mole) was then added. The solution was stirred at room temperature for 4 hr. The precipitate was isolated by filtration, washed with 10% aqueous sodium hydroxide solution, and dissolved in boiling water. Traces of insoluble 4,4'-dimethoxybiphenyl were separated by hot filtration. The crude product was precipitated upon addition of dilute hydrochloric acid to the filtrate. The precipitate was collected, washed with water, and recrystallized from ethanol to yield (III-1) (30 g, 70%).

(III-2): To a solution of sodium hydroxide (30.0 g, 0.75 mole) in 800 mL of water was added 4-hydroxybenzoic acid (35.8 g, 0.259 mole). The solution was then cooled to −10° C.; then methyl chloroformate (40.0 g, 0.423 mole) was slowly added, the temperature not being allowed to exceed −5° C. The resulting slurry was stirred for 4 hr before acidification to pH5 with concentrated hydrochloric acid. The crude product was isolated by filtration and recrystallized from ethanol to yield (III-2) (35.0g, 69%).

(III-3): To a solution containing (I-2) (10.0 g, mole) and a few drops of N,N-dimethylformamide in 200 mL of methylene chloride was added dropwise oxalyl chloride (6.65 ml, 0.06 mole) at room temperature. The reaction mixture was stirred for 1 hr; the solvent was then evaporated, and excess oxalyl chloride was removed under vacuum. The resultant acid chloride in 100 mL of anhydrous THF was added to a solution of (I-1 ) (12.3 g, 0.06 mole) and pyridine (4.95 ml, 0.06 mole) in 100 mL of anhydrous THF at room temperature. The mixture was stirred for 12 hr before dilution with 500 mL of chloroform. The solution was washed with water and then dried over anhydrous sodium sulfate. Following evaporation of the solvent, the residue was recrystallized from ethanol to yield (III-3) (11.5 g, 61%).

(III-4): To a solution of 10.0 g (0.026 mole) (1-3) in 200 mL of 95% ethanol was added 30% ammonium hydroxide (30 mL) at room temperature. The reaction mixture was stirred for 1 hr and then acidified to pH5 with concentrated hydrochloric acid. The solution was diluted with 200 mL of chloroform, and the organic phase was washed with water before drying over anhydrous sodium sulfate. The solvent was removed to yield (III-4) (7.6 g, 90%).

(III-5): To a solution containing (I-4) (3.0 g, 9.38 mmole) and potassium hydroxide (0.63 g, 11.3 mmole) in 10 mL of N,N-dimethylformamide was added dropwise 1-bromoethanol (0.94 mL, 11.3 mmole) at 80° C. The reaction mixture was stirred at 80° C. for 24 hr before dilution with 100 mL of methylene chloride. The solution was washed with water and dried over anhydrous sodium sulfate. After removal of the solvent, the solid was recrystallized from ethanol to yield (III-5) (1.6 g, 46%).

(III): To a stirred solution containing (I-5) (0.5 g, 1.37 mmole), triphenyl phosphine (0.36 g, 1.37 mmole) and 1,3,5-cyclohexanetricarboxylic acid (0.084 g, 0.38 mmole) in 15 mL of anhydrous THF was added dropwise a solution of diethyl azodicarboxylate (DEAD) (0.17 ml, 1.37 mmole) in 5 mL of anhydrous THF under nitrogen atmosphere. The reaction mixture was stirred for 3 hr before evaporating the solvent. With 40:1 methylene chloride/acetone both as solvent and eluent, the solid residue was purified by flash chromatography on silica gel. Further purification was accomplished via recrystallization from methanol containing a little methylene chloride to yield (III) (0.5 g, 90%).

Using differential scanning calorimetry, the glass transition temperature. $T_g$, and clearing temperature, $T_c$, for (III) were determined to be 177° C. and 278° C. respectively.
Example 4
Preparation of Compound (IV)
Compound (IV) was prepared by the following reaction scheme:
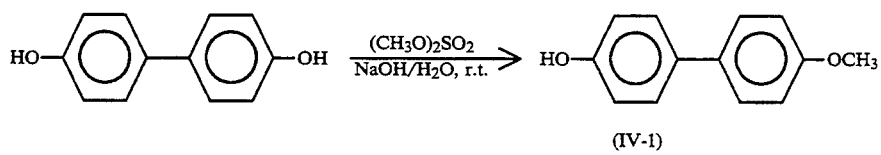
(IV-1)
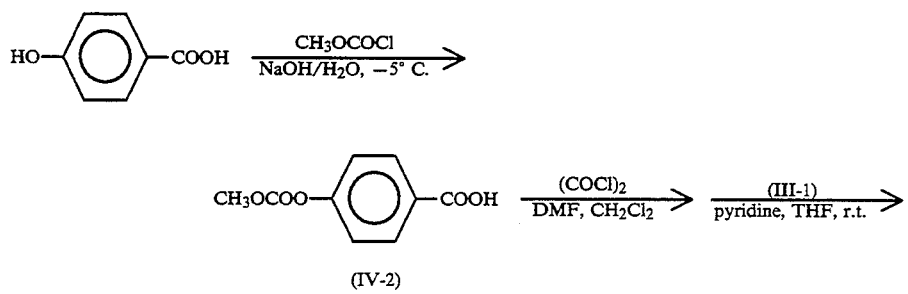
(IV-2)
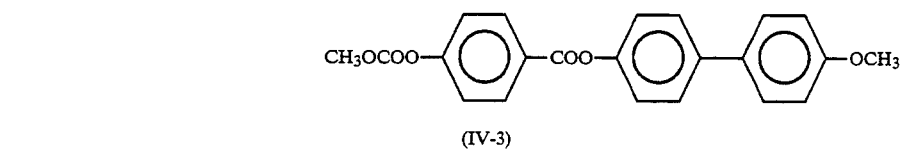
(IV-3)
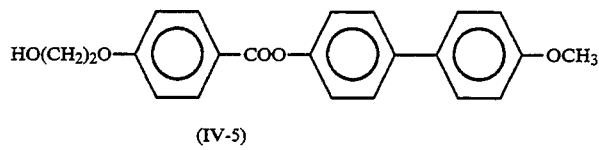
(IV-5)
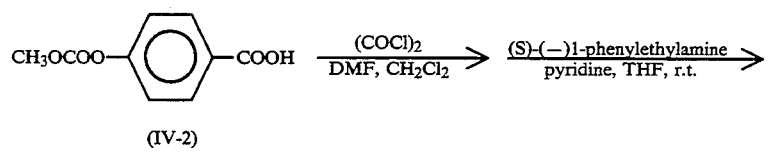
(IV-2)
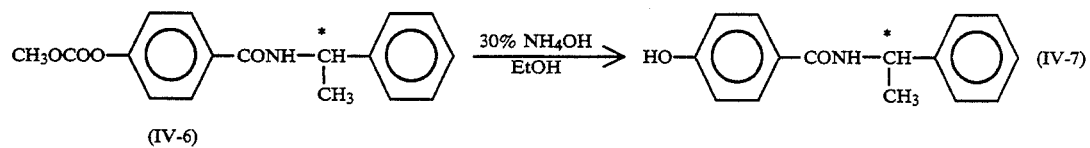
(IV-6)                                                   (IV-7)
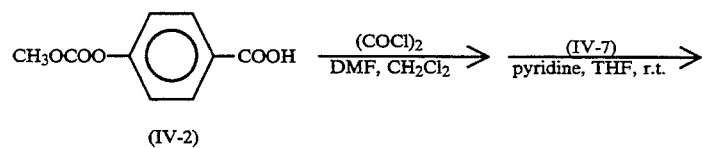
(IV-2)
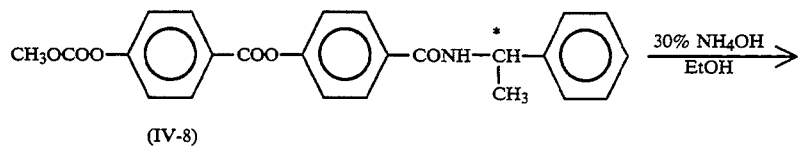
(IV-8)

-continued

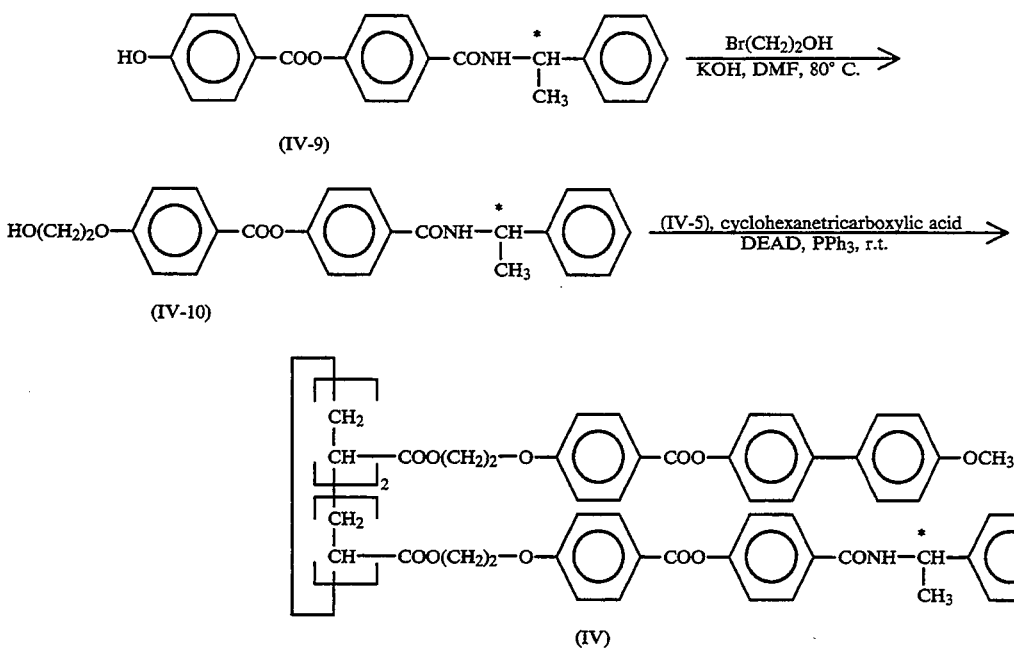

(IV-1): 4,4'-dihydroxybiphenyl (40.0 g, 0.215 mole) was dissolved in a solution sodium hydroxide (17.2 g, 0.43 mole) in 160 mL of water, to which dimethyl sulfate (27 g, 0.214 mole) was then added. The mixture was stirred at room temperature for 4 hr. The precipitate was isolated by filtration, washed with 10% aqueous sodium hydroxide solution and dissolved in boiling water. Traces of insoluble 4,4'-dimethoxybiphenyl were separated by hot filtration. The crude product was precipitated upon addition of dilute hydrochloric acid to the filtrate. The precipitate was collected, washed with water, and recrystallized from ethanol to yield (IV- 1) (30 g, 70%).

(IV-2): To a solution of sodium hydroxide (30.0 g, 0.75 mole) in 800 mL of water was added 4-hydroxybenzoic acid 05.8 g, 0.259 mole). The solution was then cooled to $-10°$ C,. and methyl chloroformate (40.0 g, 0.423 mole) was slowly added, the temperature not being allowed to exceed $-5°$ C. The resulting slurry was stirred for 4 hr before acidification to pH5 with concentrated hydrochloric acid. The crude product was isolated by filtration and recrystallized from ethanol to yield (IV-2) (35.0 g, 69%).

(IV-3): To a solution containing (IV-2) (10.0 g, 0.05 mole) and a few drops of N,N-dimethylformamide in 200 mL of methylene chloride was added dropwise oxalyl chloride (6.65 mL, 0.06 mole) at room temperature. The reaction mixture was stirred for 1 hr. The solvent was then evaporated, and excess oxalyl chloride was removed under vacuum. The resultant acid chloride in 100 mL of anhydrous THF was added to a solution containing (IV-1) (12.3 g, 0.06 mole) and pyridine (4.95 mL, 0.06 mole) in 100 mL of anhydrous THF at room temperature. The mixture was stirred for 12 hr before dilution with 500 mL of chloroform. The solution was washed with water and then dried over anhydrous sodium sulfate. After removal of the solvent, the solid residue was recrystallized from ethanol to yield (IV-3) (11.5 g, 61%).

(IV-4): To a solution of 10.0 g (0.026 mole) (IV-3) in 200 mL of 95% ethanol was added 30% ammonium hydroxide (30 mL) at room temperature. The reaction mixture was stirred for 1 hr and then acidified to pH5 with concentrated hydrochloric acid. The solution was diluted with 200 mL of chloroform, and the organic phase was washed with water before drying over anhydrous sodium sulfate. The solvent was removed to yield (IV-4) (7.6 g, 90%).

(IV-5): To a solution at 80° C. of (IV-4) (3.0 g, 9.38 mmole) and potassium hydroxide (0.63 g, 11.3 mmole) in 10 mL of N,N-dimethylformamide was added dropwise 1-bromoethanol (0.94 mL, 11.3 mmole). The reaction mixture was stirred at 80° C. for 24 hr before dilution with 100 mL of methylene chloride. The resulting solution was washed with water and dried over anhydrous sodium sulfate. Following removal of the solvent, the residue was recrystallized from ethanol to yield (IV-5) (1.6 g, 46%).

(IV-6): To a solution containing (IV-2) (3.0 g, 15.3 mmole) and a few drops of N,N-dimethylformamide in 30 mL of methylene chloride was added dropwise oxalyl chloride (2.53 g, 20 mmole) at room temperature. After stirring for 1 hr, the solvent was evaporated, and excess oxalyl chloride was removed under vacuum. The resultant acid chloride was dissolved in 20 mL of anhydrous THF, which was mixed with a solution of (S)-(—)- 1-phenylethylamine (2.22 g, 18 mmole) and pyridine (1.57 g, 20 mmole) in 20 mL of anhydrous THF at room temperature. The reaction mixture was stirred for 12 hr before dilution with 200 mL of chloroform. The solution was washed with water and then dried over anhydrous sodium sulfate. After removal of the solvent, the solid residue was recrystallized from ethanol to yield (IV-6) (2.69 g, 73%).

(IV-7): To a solution of (IV-6) (2.69 g, 9.0 mmole) in 150 mL of 95% ethanol was added 30% ammonium hydroxide (30 mL) at room temperature. The reaction mixture was stirred for 1 hr before being acidified to pH5 with concentrated hydrochloric acid. The solution was diluted with 150 mL of chloroform, and the organic portion was washed with water before drying over anhydrous sodium sulfate. The solvent was then removed, yielding (IV-7) (1.95 g, 90%).

(IV-8): To a solution containing (IV-2) (1.50 g, 7.65 mmole) and a few drops of N,N-dimethylformamide in 10 mL of methylene chloride was added dropwise oxalyl chloride (0.8 ml, 9.18 mmole) at room temperature. After stirring for 1 hr. the solvent was evaporated, and excess oxalyl chloride was removed under vacuum. The resultant acid chloride was dissolved in 10 mL of anhydrous THF, and the solution was mixed with a solution of (III-7) (2.20 g, 9.18 mmole) and pyridine (0.74 mL, 9.18 mmole) in 10 mL of anhydrous THF. The reaction mixture was stirred for 12 hr before dilution with 100 mL of chloroform. The resulting solution was washed with water and dried over anhydrous sodium sulfate. Following removal of the solvent, the solid was recrystallized from ethanol to yield (IV-8) (2.0 g, 63%).

(IV-9): To a solution of (IV-8) (2.13 g, 5.03 mmole) in 100 mL of 95% ethanol was added 20 mL of 30% ammonium hydroxide at room temperature. The reaction mixture was stirred for 1 hr before acidification to pH5 with concentrated hydrochloric acid. The solution was then diluted with 100 mL of chloroform, and the resulting solution was dried over anhydrous sodium sulfate. The solvent was removed to yield (IV-9) (1.73 g, 95%).

(IV-10): To a solution at 80° C. of (IV-9) (1.73 g, 4.78 mmole) and potassium hydroxide (0.32 g, 5.73 mmole) in 10 mL of N,N-dimethylformamide was added dropwise 1-bromoethanol (0.48 mL, 5.73 mmole). The reaction mixture was stirred for 24 hr at 80° C. before dilution with 100 mL of methylene chloride. The resulting solution was dried over anhydrous sodium sulfate. Following removal of the solvent, the solid was recrystallized from ethanol to yield (IV-10) (1.0 g, 52%).

(IV): To a stirred solution of (IV-5) (0.50 g, 1.37 mmole), (IV-10) (0.279 g, 0.687 mmole), triphenylphosphine (0.54 g, 2.06 mmole) and 1,3,5-cyclohexanetricarboxylic acid (0.124 g, 0.573 mmole) in 15 mL of anhydrous THF was added dropwise a solution of diethyl azodicarboxylate (DEAD) (0.253 mL, 2.06 mmole) in 5 mL of anhydrous THF under a nitrogen atmosphere. The reaction mixture was stirred for 3 hr before the solvent was evaporated. The solid residue was purified by flash chromatography on silica gel with 40:1 methylene chloride/acetone as the solvent and the eluent. Further purification was accomplished via precipitation from methanol, yielding (IV) (0.66 g, 90%). Elemental analysis: % Calculated: C. 71.35; H, 5.33; N, 1.08; % Found: C, 71.16; H, 5.36; N, 1.13.

Differential scanning calorimetry measurements with (IV) gave a glass transition temperature, $T_g$, of 69° C. and a clearing temperature, $T_c$, of 137° C.

Example 5

Preparation Of Compound (V)

Compound (V) was prepared by the same procedure used for (IV), with the exception that (I-8) was used in place of (IV-5) in the last step.

Example 6

Preparation of Chiral Nematic Mixture((VI)

The chiral nematic mixture (VI) was prepared by the following reaction scheme

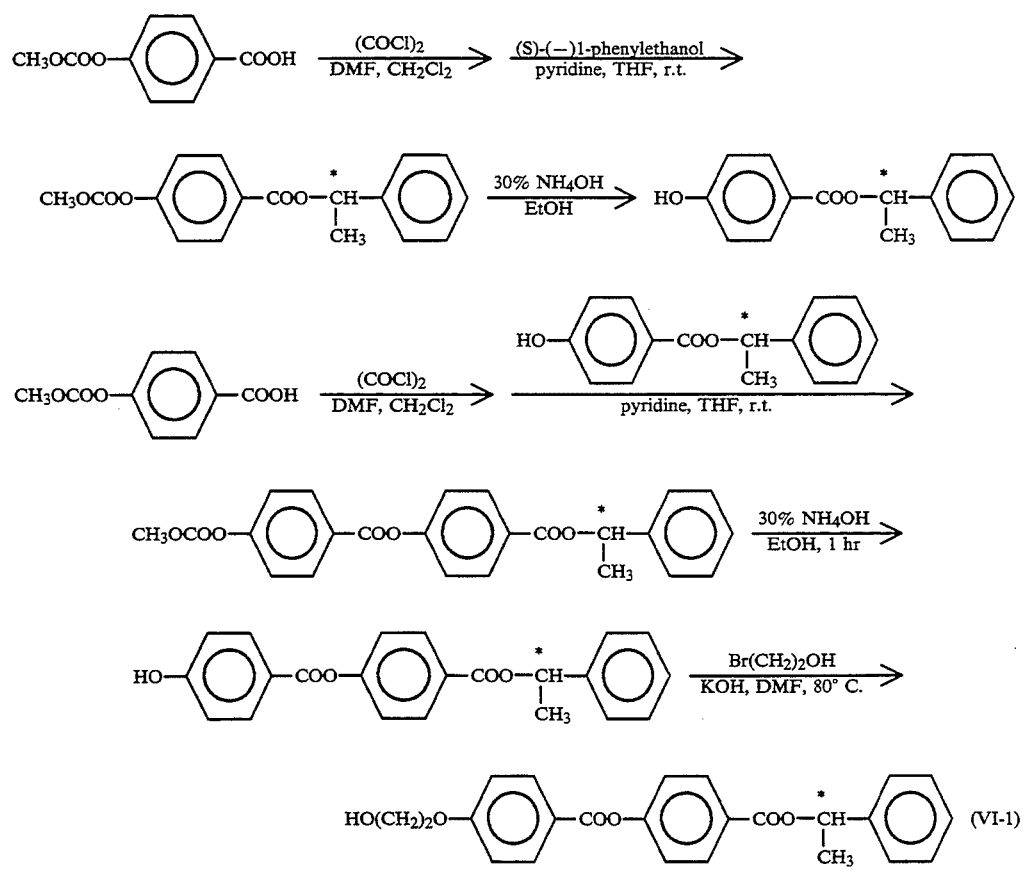

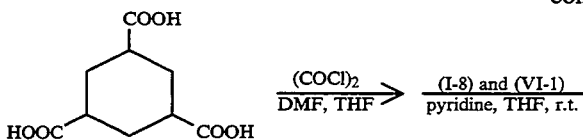

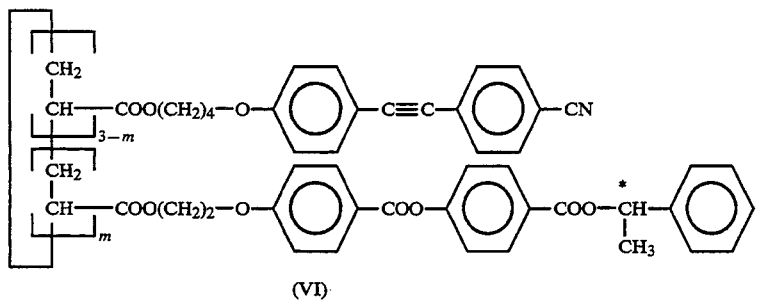

(VI-1): Intermediate (VI-1) was synthesized following the procedures outlined above for Intermediate (IV-10), using (S)-(−)-1-phenylethanol instead of (S)-(−)-1-phenylethylamine.

(VI): To a solution of 1,3,5-cyclohexanetricarboxylic acid (0.187 g, 0.86 mmole) and a few drops of N,N-dimethylformamide in 10 mL of anhydrous THF was added dropwise 2M oxalyl chloride solution in anhydrous THF (1.42 mL of solution containing 2.84 mmole of oxalyl chloride) at room temperature. After 1 hr stirring of the reaction mixture, the solvent was evaporated, and excess oxalyl chloride was removed under vacuum. The resultant acid chloride was dissolved in 10 mL of anhydrous THF, and the solution was added to a mixture of (I-8) (0.50 g, 1.72 mmole), (VI-1) (0.43 g, 1.03 mmole) and pyridine (0.23 mL, 2.84 mmole) in 10 mL of anhydrous THF. The reaction mixture was stirred for 12 hr before the solvent was evaporated. The solid residue was purified by flash chromatography on silica gel with methylene chloride as the solvent and the eluent. Further purification was accomplished via precipitation from methanol, yielding the chiral nematic mixture (VI) (0.35 g). HPLC and proton NMR integration analysis revealed that (VI) is a multicomponent mixture with an overall chiral mole fraction of 0.11.

Example 7

Preparation of Compound (VIII)

Compound (VII) was prepared by the following reaction scheme:

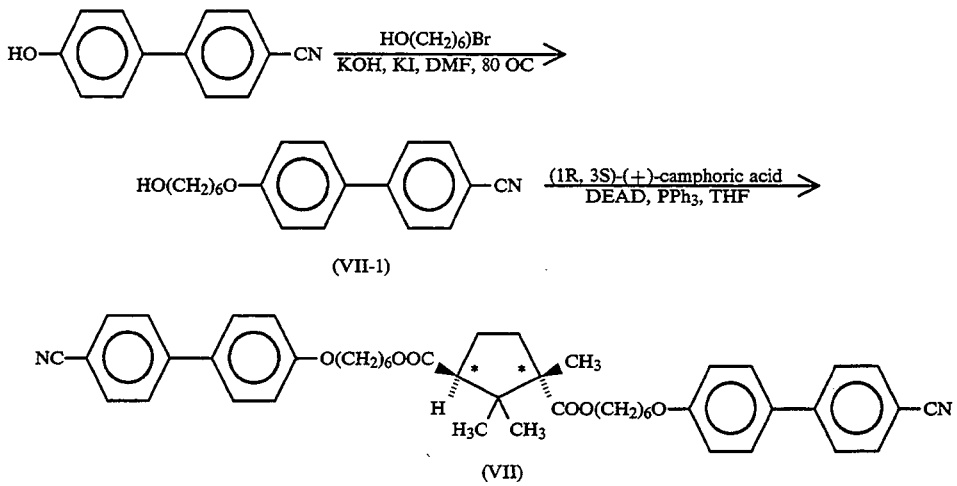

(VII-1): To a solution at 80° C. of 4-hydroxy-4'-cyanobiphenyl (5.0 g, 25.6 mmole), potassium hydroxide (1.43 g, 25.6 mmole) and a few crystals of potassium iodide in 10 mL of N,N-dimethylformamide was added dropwise 6-bromo-1-hexanol (3.35 mL, 25.6 mmole). The reaction mixture was stirred for 24 hr at 80° C. before dilution with 500 mL of methylene chloride. The resulting solution was dried over anhydrous sodium sulfate and evaporated to dryness. The solid was recrystallized from ethanol to yield (VII-1) (43. g, 57%).

(VII): To a stirred solution of (VII-1) (0.74 g, 2.51 mmole), triphenylphosphine (0.658 g, 2.51 mmole) and (1R, 3S)-(+)-camphoric acid (0.124 g, 0.573 mmole) in 15 mL of anhydrous THF was added dropwise a solution of diethyl azodicarboxylate (DEAD) (0.31 mL, 2.51 mmole) in 5 mL of anhydrous THF under a nitrogen atmosphere. The reaction mixture was stirred for 3 hr before the solvent was evaporated. The solid residue was purified by flash chromatography on silica gel with 40:1 methylene chloride/acetone as the solvent and the eluent. Further purification was accomplished via precipitation from methanol, yielding (VII) (0.76 g, 92%).

Elemental analysis: % Calculated: C, 76.39; H, 7.16; N, 3.71; % Found: C, 76.06; H, 6.82; N, 4.14.

The glass transition temperature, $T_g$, and clearing temperature, $T_c$, for (VII) were determined to be $-5°$ C. and 42° C., respectively.

Example 8

Formation of Optical Devices

Optical devices were formed from the chiral nematic liquid crystalline compositions of the invention listed in Table 3. The thermal transition temperatures $T_g$ and $T_c$ shown in Table 3 were determined by differential scanning calorimetry.

TABLE 3

| Optical Device | Liquid Crystalline Composition | $T_g$ (°C.) | $T_c$ (°C.) | Chiral Mole Fraction | $\lambda_R$ (nm) |
|---|---|---|---|---|---|
| A | (IV) | 69 | 137 | 0.33 | 425 |
| B | (IV) + (III) | 68 | 170 | 0.26 | 557 |
| C | (IV) + (III) | 68 | 190 | 0.20 | 705 |
| D | (VI) + (I) | 29 | 75 | 0.06 | 964 |
| E | (VII) | −5 | 42 | 0.50* | 1600 |
| F | (I) + (II) | 36 | 85 | 0.62 | 1355 |

*Two asymmetric centers in cycloaliphatic radical and two nematogenic moieties

Films having a thickness of approximately 10 μm were formed from melts of the liquid crystalline compositions between a pair of glass plates (Corning 7059 baria alumina borosilicate glass with a refractive index of 1.53 at 589.3 nm). The devices were heated above the clearing temperature, sheared to induce alignment, and annealed at 95% of the clearing temperature for 1 hour. Selective reflection wavelengths, $\lambda_R$, were determined using a Perkin-Elmer Lambda 9 UV—visible—near IR spectrophotometer.

Optical device A, formed from the chiral nematic liquid crystalline compound (IV), displayed a $\lambda_R$ of 425 nm. Mixtures of (IV) with varying amounts of the nonchiral liquid crystalline compound (III) were used to form devices B and C, whose $\lambda_R$ values were 557 nm and 705 nm, respectively.

Optical device D was formed from a composition comprising (VI), a mixture of chiral nematic liquid crystalline compounds, and the nonchiral liquid crystalline compound (I). The chiral mole fraction of the resulting mixture was 0.06. The selective reflection wavelength of the device was 964 nm.

Optical device E contains a film of compound VII, whose structure comprises two nematogenic moieties attached to a chiral cycloaliphatic radical. Device E exhibited a $\lambda_R$ of 1600 nm.

A mixture of the nonchiral liquid crystalline compound (I) and the chiral compound (II), which had a chiral mole fraction of 0.62, was employed to form optical device F. The selective reflection wavelength, $\lambda_R$, of this device was 1355 nm.

The invention has been described in detail with particular reference to preferred embodiments thereof, but it will be understood that variations and modifications can be effected within the spirit and scope of the invention.

What is claimed is:

1. A glassy thermotropic chiral nematic liquid crystalline composition comprising a glassy chiral nematic compound of low molar mass having the formula:

or a mixture of a nematic liquid crystalline compound of low molar mass having the formula:

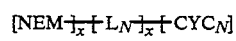

and a chiral compound of low molar mass having the formula:

where

each independently represents a cycloaliphatic radical containing about 4 to 18 carbon atoms;

represents a nematogenic moiety having the formula:

where —Q— is an alkylene radical containing 1 to about 8 carbon atoms, —X— is —O—, —S—, or —CH$_2$—, —Y— is

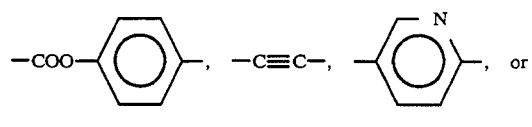

—D— and —E— are each independently

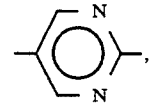

—Z is —CN, —NO$_2$, —N=C=S, or an alkoxy radical containing up to about 4 carbon atoms, and q and r are each independently 0 or 1;

represents a chiral moiety having the formula:

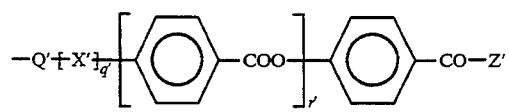

where Q' is an alkylene radical containing 1 to about 8 carbon atoms, —X' is —O—, —S—, or —CH$_2$—, Z' is an alkoxy, aralkoxy, alkylamino, or aralkylamino radical containing about 4 to 12 carbon atoms and containing at least one asymmetric carbon atom, and q' and r' are each independently 0 or 1; —L$_N$— and —L$_C$— each individually represents a connecting group having the formula:

where R is hydrogen or alkyl containing up to 4 carbon atoms, or forms a portion of a cycloaliphatic radical containing about 4 to 18 carbon atoms; and x is 1 to 6, and y is at least 1, with the proviso that when

is chiral, y can be zero.

2. A composition of claim 1 where the sum of x and y is from 3 to 6.

3. A composition of claim 1 where x is 1 to 3.

4. A composition of claim 1 where —X— is —O—, —Y— is —C≡C— or p-carbonyloxyphenyl, both —D— and —E— are p-phenylene, —Z is —CN or —OCH$_3$, q is 1, and r is 0 or 1.

5. A composition of claim 4 where —Q— contains 2 to 4 carbon atoms and —Z is —CN.

6. A composition of claim 1 where Z' is an alkoxy or aralkoxy radical derived from an alcohol.

7. A composition of claim 6 where said alcohol is 1-phenylethanol.

8. A composition of claim 1 where Z' is an alkylamino or aralkylamino radical derived from an amine.

9. A composition of claim 8 where said amine is 1-phenylethylamine.

10. A composition of claim 1 where

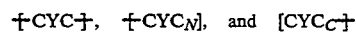

each independently contains about 5 to 10 carbon atoms.

11. A composition of claim 10 where

each independently contains 6 carbon atoms.

12. A composition of claim 11 where

contains 6 carbon atoms, x is 2, and y is 1.

13. A composition of claim 1 where

is chiral and y is zero.

14. A composition of claim 1 where

further includes a nitrogen or oxygen atom.

15. A composition of claim 1 where

+CYC+ is polycyclic.

16. A composition of claim 1 comprising a plurality of chiral nematic compounds.

17. A composition of claim 1 comprising

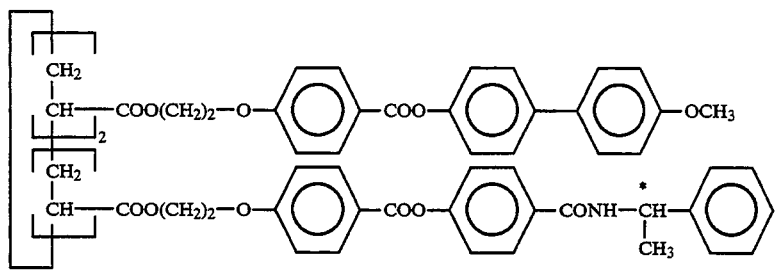

(IV)

18. A composition of claim 17 further comprising

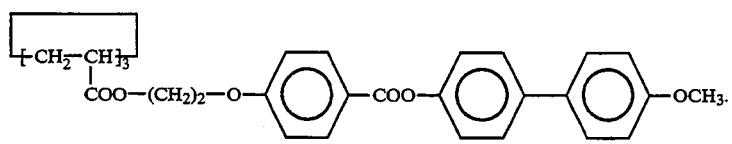

(III)

19. A composition of claim 1 comprising the chiral mixture

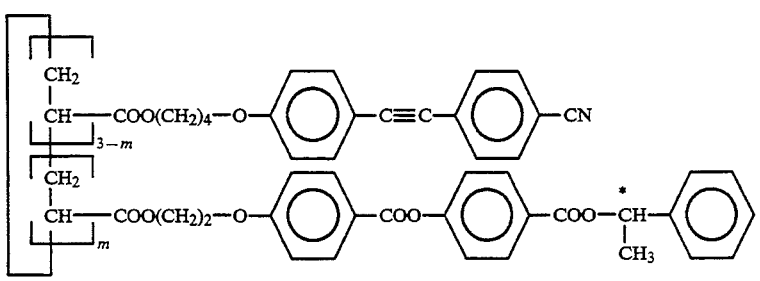

(VI)

having a chiral mole fraction of 0.11.

20. A composition of claim 19 further comprising

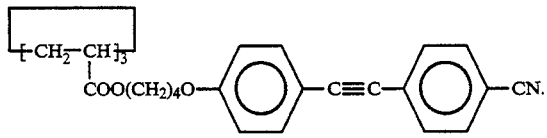

(I)

21. A composition of claim 1 comprising

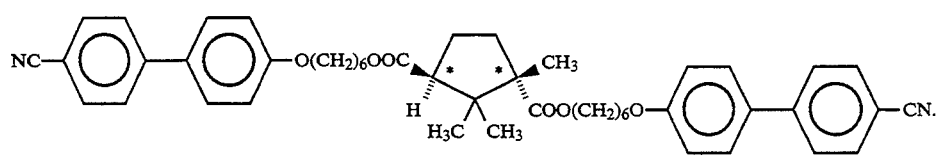

22. A composition of claim 1 comprising a mixture of

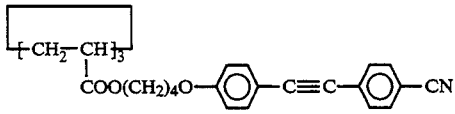

(I)

and

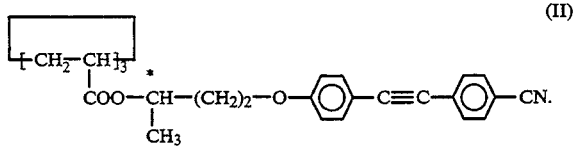

(II)

23. An optical device comprising an optically transparent substrate and a film formed from a glassy thermotropic chiral nematic liquid crystalline composition comprising a glassy chiral nematic compound of low molar mass having the formula:

[NEM⫨$\frac{1}{x}$⫨L$_N$⫨$\frac{1}{x}$⫨CYC⫨⫨L$_C$⫨$\frac{1}{y}$⫨CHI]$_y$ or a mixture of a nematic liquid crystalline compound of low molar mass having the formula:

[NEM⫨$\frac{1}{x}$⫨L$_N$⫨$\frac{1}{x}$⫨CYC$_N$]

and a chiral compound of low molar mass having the formula:

[CYC$_C$⫨⫨L$_C$⫨$\frac{1}{y}$⫨CHI]$_y$

-continued where

⫨CYC⫨, ⫨CYC$_N$], and [CYC$_C$⫨ each independently represents a cycloaliphatic radical containing about 4 to 18 carbon atoms;

[NEM⫨

(VII)

represents a nematogenic moiety having the formula:

Z—E⫨Y⫨$_r$D⫨X⫨$_q$Q— where —Q— is an alkylene radical containing 1 to about 8 carbon atoms, —X— is —O—, —S—, or —CH$_2$—, —Y— is

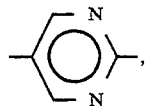

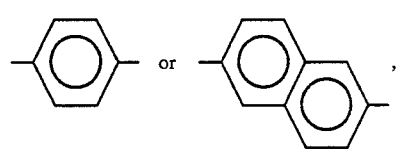

—Z is —CN, —NO$_2$, —N=C=S, or an alkoxy radical containing up to about 4 carbon atoms, and q and r are each independently 0 or 1;

⫨CHI]

represents a chiral moiety having the formula:

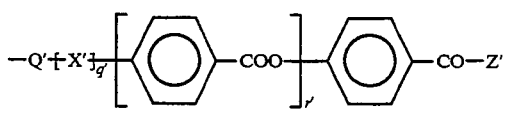

where Q' is an alkylene radical containing 1 to about 8 carbon atoms, —X' is —O—, —S—, or —CH$_2$—, Z' is an alkoxy, aralkoxy, alkylamino, or aralkylamino radical containing about 4 to 12 carbon atoms and containing at least one asymmetric carbon atom, and q' and r' are each independently 0 or 1; —L$_N$— and —L$_C$— each individually represents a connecting group having the formula:

$$-\overset{O}{\underset{\|}{C}}-O-,\ -O-\overset{O}{\underset{\|}{C}}-,\ -\overset{O}{\underset{\|}{C}}-\overset{R}{\underset{|}{N}}-,\ -\overset{R}{\underset{|}{N}}-\overset{O}{\underset{\|}{C}}-,\ \text{or}\ -O-$$

where R is hydrogen or alkyl containing up to 4 carbon atoms, or forms a portion of a cycloaliphatic radical containing about 4 to 18 carbon atoms: and x is 1 to 6, and y is at least 1, with the proviso that when

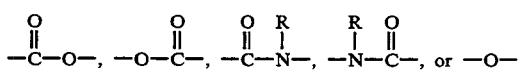

is chiral, y can be zero.

24. An optical device according to claim 23 where said substrate is glass or fused quartz.

25. An optical device according to claim 23 where said film has a thickness about 0.5 μm to 50 μm.

26. An optical device according to claim 25 where said thickness is about 5 μm to 20 μm.

27. An optical device according to claim 23 where said chiral nematic liquid crystalline composition comprises

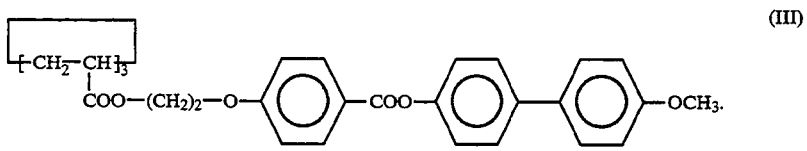

(IV)

28. An optical device according to claim 27 where said chiral nematic liquid crystalline composition further comprises (III)

29. An optical device according to claim 23 where said chiral nematic liquid crystalline composition comprises the chiral mixture

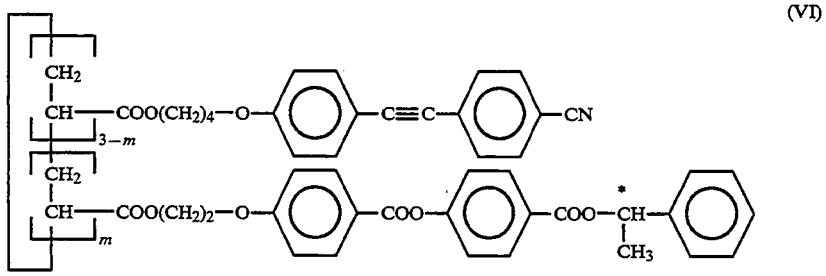

(VI)

having a chiral mole fraction of 0.11.

30. An optical device according to claim 29 where said chiral nematic liquid crystalline composition further comprises (I)

31. An optical device according to claim 23 where said chiral nematic liquid crystalline composition comprises

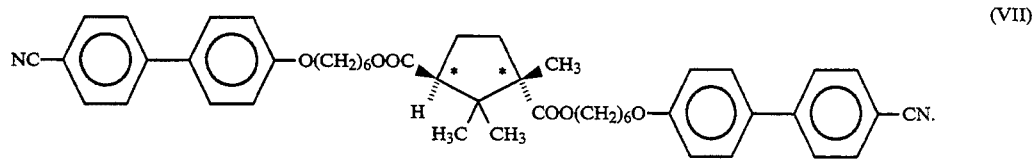
(VII)
32. An optical device according to claim 23 where said chiral nematic liquid crystalline composition comprises a mixture of
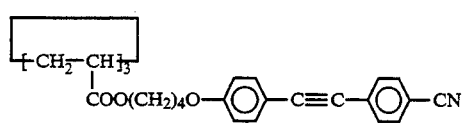
(I)
-continued
and
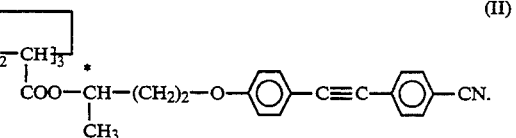
(II)
* * * * *